(12) United States Patent
Yau et al.

(10) Patent No.: US 11,177,740 B1
(45) Date of Patent: Nov. 16, 2021

(54) POWER CONVERSION APPARATUS WITH OSCILLATION REDUCTION CONTROL, OSCILLATION REDUCTION CONTROL MODULE, AND METHOD OF OPERATING THE SAME

(71) Applicant: ASIAN POWER DEVICES INC., Taoyuan (TW)

(72) Inventors: Yeu-Torng Yau, Taoyuan (TW); Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 0 days.

(21) Appl. No.: 17/096,692

(22) Filed: Nov. 12, 2020

(30) Foreign Application Priority Data

Sep. 1, 2020 (TW) .................... 109129931

(51) Int. Cl.
*H02M 3/335* (2006.01)
*H02M 1/14* (2006.01)
*H02M 1/44* (2007.01)
*H02M 5/293* (2006.01)

(52) U.S. Cl.
CPC ....... *H02M 3/33507* (2013.01); *H02M 1/143* (2013.01); *H02M 1/44* (2013.01); *H02M 3/33592* (2013.01); *H02M 5/293* (2013.01)

(58) Field of Classification Search
CPC .. H02M 1/143; H02M 1/144; H02M 3/33507; H02M 3/33592; H02M 5/293
See application file for complete search history.

(56) References Cited

U.S. PATENT DOCUMENTS

| 7,133,300 | B1* | 11/2006 | Yang | H02H 7/122 363/56.11 |
| 7,602,151 | B2* | 10/2009 | Lai | H02J 7/04 320/145 |
| 9,318,961 | B2* | 4/2016 | Tadamasa | H02M 3/33507 |
| 10,763,752 | B1* | 9/2020 | Li | H02M 3/33523 |
| 11,095,207 | B1* | 8/2021 | Yau | H02M 1/4225 |
| 2004/0264221 | A1* | 12/2004 | Mori | H02M 3/33523 363/39 |
| 2007/0257721 | A1* | 11/2007 | von Kaenel | H03K 19/00361 327/309 |
| 2008/0238364 | A1* | 10/2008 | Weber | H02J 50/70 320/108 |

(Continued)

*Primary Examiner* — Yusef A Ahmed
(74) *Attorney, Agent, or Firm* — Muncy, Geissler, Olds & Lowe, P.C.

(57) ABSTRACT

A power conversion apparatus with oscillation reduction control supplies power to a load through an output end. The power conversion apparatus includes a transformer, a power switch, a control module, and an oscillation reduction control module. A primary side of the transformer receives an input voltage, and a secondary side of the transformer is coupled to the output end. The power switch is coupled to the primary side. The control module is coupled to the power switch, controls the power switch continuously turning on and turning off, and converts the input voltage into an output voltage. When the oscillation reduction control module detects a resonance voltage through the secondary side, the oscillation reduction control module performs an oscillation reduction operation to the resonance voltage to reduce an amplitude of the resonance voltage by a damper.

15 Claims, 8 Drawing Sheets

(56) References Cited

U.S. PATENT DOCUMENTS

| | | | |
|---|---|---|---|
| 2009/0219003 A1* | 9/2009 | Yang | H02M 3/33592 323/283 |
| 2010/0182808 A1* | 7/2010 | Sato | H02M 3/33592 363/21.18 |
| 2011/0228566 A1* | 9/2011 | Liang | H02M 3/3376 363/21.02 |
| 2015/0117070 A1* | 4/2015 | Wang | H02M 3/33561 363/21.14 |
| 2015/0357924 A1* | 12/2015 | Lin | H02M 3/33507 363/21.18 |
| 2016/0028313 A1* | 1/2016 | Kong | H02M 1/08 363/21.12 |
| 2016/0028314 A1* | 1/2016 | Kong | H02M 3/33507 363/21.12 |
| 2016/0233779 A1* | 8/2016 | Cohen | H02M 3/33592 |
| 2017/0237356 A1* | 8/2017 | Chen | H02M 3/337 363/21.02 |
| 2018/0013352 A1* | 1/2018 | Cao | H02M 1/08 |
| 2018/0212527 A1* | 7/2018 | Kong | H02M 1/08 |
| 2019/0199222 A1* | 6/2019 | Lin | H02M 3/33592 |
| 2019/0260284 A1* | 8/2019 | Liu | H02M 1/15 |
| 2020/0036280 A1* | 1/2020 | Yang | H02M 1/083 |
| 2020/0395862 A1* | 12/2020 | Hara | H02M 3/33592 |
| 2021/0091654 A1* | 3/2021 | Rajesh | H02M 3/33523 |
| 2021/0143725 A1* | 5/2021 | Deng | H02M 1/08 |

* cited by examiner

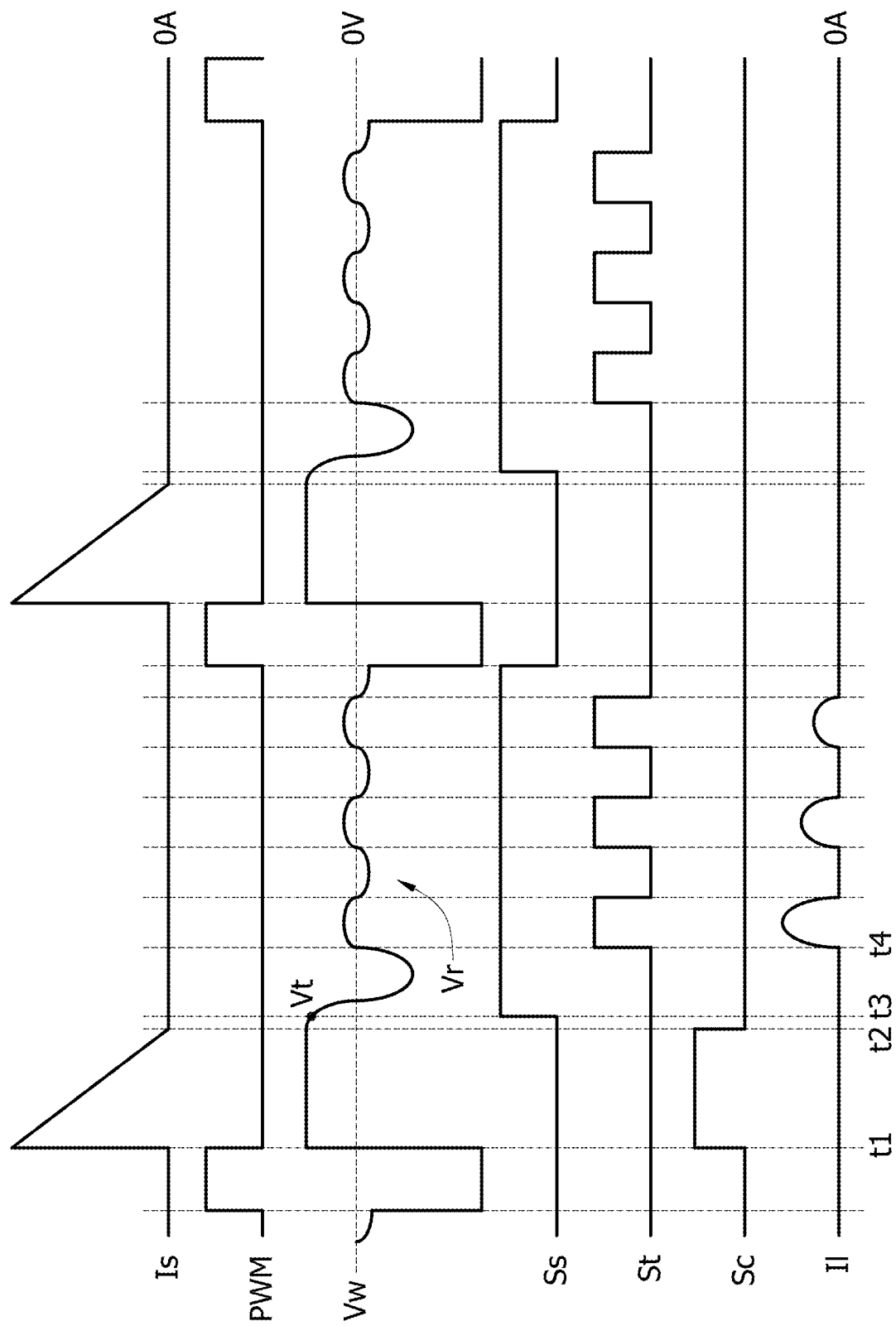

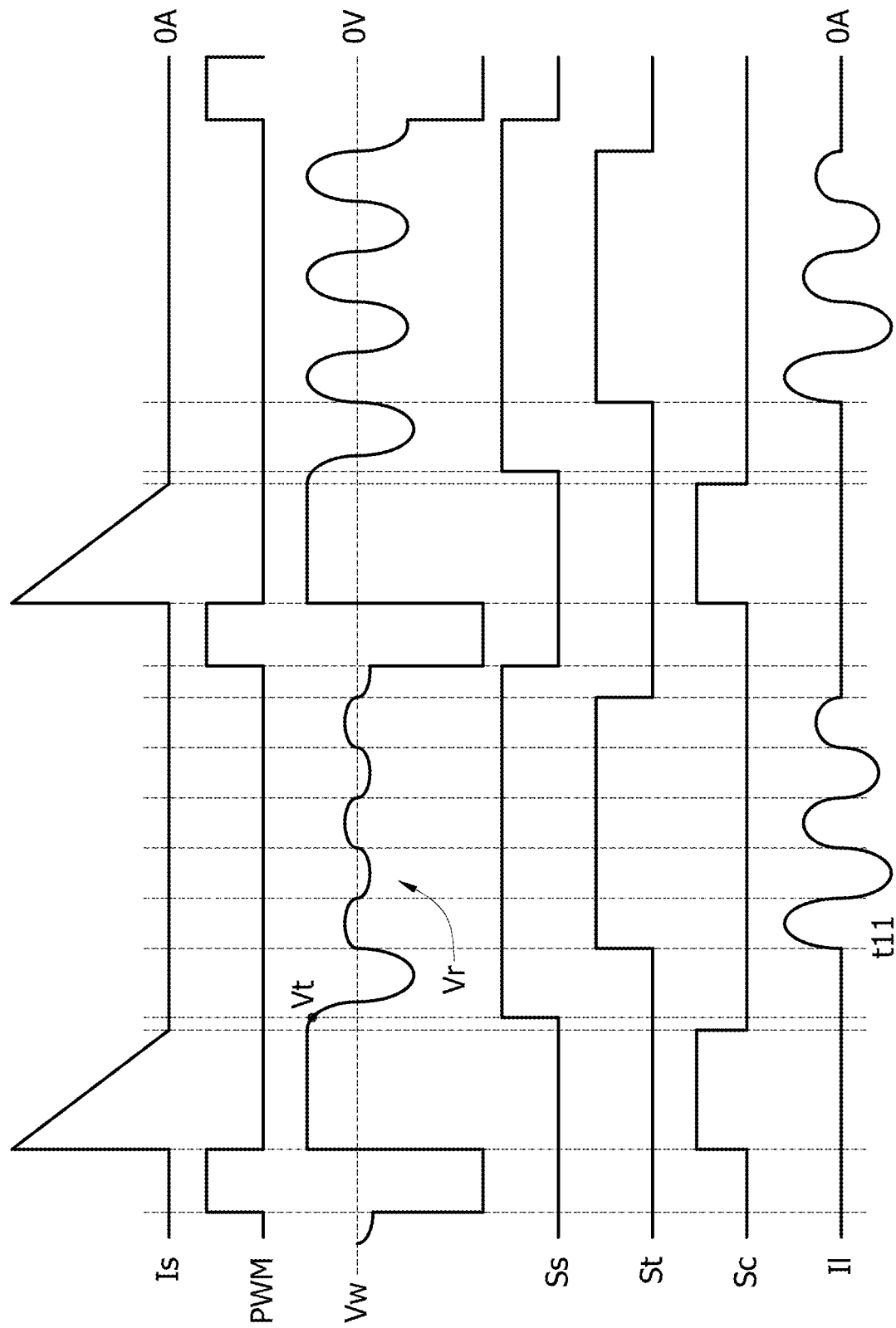

POWER CONVERSION APPARATUS WITH OSCILLATION REDUCTION CONTROL, OSCILLATION REDUCTION CONTROL MODULE, AND METHOD OF OPERATING THE SAME

BACKGROUND

Technical Field

The present disclosure relates to a power conversion apparatus with oscillation reduction control, an oscillation reduction module, and a method of operating the same, and more particularly to a power conversion apparatus with oscillation reduction control, an oscillation reduction module, and a method of operating the same to reduce EMI.

Description of Related Art

The statements in this section merely provide background information related to the present disclosure and do not necessarily constitute prior art.

Since an input end and an output end of a flyback converter can be electrically isolated by a transformer and can be used for power delivery (PD) control, the demand for flyback converters is rapidly increasing. In particular, flyback converters can be used for step-up conversion or step-down conversion of electric power. Therefore, in the case of flexible power configuration, flyback converters have increasingly become the mainstream converter in the industry.

However, since conventional flyback converters are usually operated in discontinuous conduction mode (DCM), the current flowing through the secondary-side winding of the transformer will drop to zero, and then the parasitic capacitance based on the power switch at the primary side will resonate with the magnetizing inductance. The resonance generates a resonance voltage, and the frequency of the resonant voltage is between hundreds of kHz and 10 MHz, which may cause the mid-frequency band of the electromagnetic interference (EMI) to exceed the safety regulations. The traditional solution is to install an RC damping shock absorber on the primary side of the transformer to absorb the amplitude of the resonance voltage, but the effect of this solution is not precise enough and the suppression effect is limited. In addition, power will continue to be consumed during the operation of the flyback converter, resulting in poor efficiency of the flyback converter.

SUMMARY

In order to solve the above-mentioned problems, the present disclosure provides a power conversion apparatus with oscillation reduction control. The power conversion apparatus with oscillation reduction control supplies power to a load through an output end, and includes a transformer, a power switch, a control module, and an oscillation reduction control module. The transformer has a primary side and a secondary side coupled to the output end, and the primary side receives an input voltage. The power switch is coupled to the primary side. The control module is coupled to the power switch, and controls the power switch continuously turning on and turning off, converts the input voltage into an output voltage through the transformer, and provides the output voltage through the output end. The oscillation reduction control module is coupled to the primary side. When the oscillation reduction control module detects a resonance voltage through the secondary side, the oscillation reduction control module performs an oscillation reduction operation to the resonance voltage to reduce an amplitude of the resonance voltage by a damper.

In one embodiment, the oscillation reduction control module acquires a winding voltage by detecting a secondary-side winding of the secondary side, and the winding voltage generates the resonance voltage when the power switch is turned off; the oscillation reduction control module determines whether the winding voltage is the resonance voltage according to the winding voltage and the output voltage.

In one embodiment, the secondary side includes a rectifying module, and the rectifying modules includes a rectifying switch, an output capacitor, and a rectifying controller. The rectifying switch is coupled to the secondary-side winding. The output capacitor is coupled to the rectifying switch and the output end, and provides the output voltage to the output end. The rectifying controller is coupled to the rectifying switch, and continuously turns on and turns off the rectifying switch synchronously with the power switch. The oscillation reduction control module is integrated with the rectifying controller so that the oscillation reduction operation is performed according to the resonance voltage when the rectifying controller controls the rectifying switch turning off.

In one embodiment, the oscillation reduction control module includes a resonance detection unit, a level trigger unit, a logic control unit, and a damping unit. The resonance detection unit receives the output voltage and the winding voltage, compares the winding voltage with a threshold voltage corresponding to the output voltage, and provides an activation signal representing that the winding voltage starts to generate an oscillation according to a result of comparing the winding voltage with the threshold voltage. The level trigger unit receives the winding voltage, compares the winding voltage with a reference voltage, and provides a trigger signal representing that the damper is provided according to a result of comparing the winding voltage with the reference voltage. The logic control unit receives the activation signal and the trigger signal. The damping unit is coupled to the logic control unit and the secondary-side winding. The logic control unit enables the damping unit when a voltage level of the winding voltage is in an enabled range set by the reference voltage so that the damping unit provides the damper to the secondary-side winding.

In one embodiment, the logic control unit enables the damping unit only when the voltage level of the winding voltage reaches to the enabled range for the first time.

In one embodiment, the oscillation reduction control module further includes a counting unit. The counting unit is coupled to the resonance detection unit and the logic control unit. The counting unit sets a predetermined counting number, and starts to count the number of times of the oscillation after the oscillation is generated by the winding voltage. When the number of times of the oscillation reaches to the predetermined counting number, the counting unit provides the activation signal representing that the number of times of the oscillation reaches to the predetermined counting number.

In one embodiment, the oscillation reduction control module further includes an open-circuit detection unit. The open-circuit detection unit is coupled to the logic control unit and the secondary side. The open-circuit detection unit detects whether a path between the output end and the secondary-side winding is open-circuit, and provides an open-circuit signal to the logic control unit. The logic control unit enables the damping unit when the path is open-circuit and the voltage level of the winding voltage reaches to the enabled range.

In one embodiment, the oscillation reduction control module further includes a disable unit. The disable unit is coupled to the logic control unit, and receives the winding voltage and the output voltage. When the disable unit realizes that a path between the output end and the secondary-side winding is connected according to the winding voltage and the output voltage, or the power switch is turned on, the disable unit notifies the logic control unit to disable the damping unit through a disabled signal.

In one embodiment, the disable unit realizes that the voltage level of the winding voltage is not in the enabled range according to the winding voltage and the reference voltage, the disable unit notifies the logic control unit to disable the damping unit through the disabled signal.

In order to solve the above-mentioned problems, the present disclosure provides an oscillation reduction control module. The power conversion apparatus includes a primary side and a secondary side, and the primary side is coupled to a power switch. The oscillation reduction control module includes a resonance detection unit, a level trigger unit, a logic control unit, and a damping unit. The resonance detection unit receives an output voltage outputted from the power conversion apparatus and a winding voltage at a secondary-side winding of the secondary side, compares the winding voltage with a threshold voltage corresponding to the output voltage, and provides an activation signal representing that the winding voltage starts to oscillate according to a result of comparing the winding voltage with the threshold voltage. The level trigger unit receives the winding voltage, compares the winding voltage with a reference, and provides a trigger signal representing that a damper is provided according to a result of comparing the winding voltage with the reference voltage. The logic control unit receives the activation signal and the trigger signal. The damping unit is coupled to the logic control unit and the secondary-side winding. The logic control unit enables the damping unit when a voltage level of the winding voltage is in an enabled range set by the reference voltage so that the damping unit provides the damper to the secondary-side winding to reduce an amplitude of the winding voltage by the damper.

In one embodiment, the logic control unit enables the damping unit only when the voltage level of the winding voltage reaches to the enabled range for the first time.

In one embodiment, the oscillation reduction control module further includes a counting unit. The counting unit is coupled to the level trigger unit and the logic control unit. The counting unit sets a predetermined counting number, and starts to count the number of times of the oscillation after the oscillation is generated by the winding voltage. When the number of times of the oscillation reaches to the predetermined counting number, the counting unit provides the activation signal representing that the number of times of the oscillation reaches to the predetermined counting number.

In one embodiment, oscillation reduction control module further includes an open-circuit detection unit. The open-circuit detection unit is coupled to the logic control unit and the secondary side. The open-circuit detection unit detects whether a path between an output end of providing the output voltage and the secondary-side winding is open-circuit, and provides an open-circuit signal to the logic control unit. The logic control unit enables the damping unit when the path is open-circuit and the voltage level of the winding voltage reaches to the enabled range.

In one embodiment, the oscillation reduction control module further includes a disable unit. The disable unit is coupled to the logic control unit, and receives the winding voltage and the output voltage. When the disable unit realizes that a path between the output end and the secondary-side winding is connected according to the winding voltage and the output voltage, or the power switch is turned on, the disable unit notifies the logic control unit to disable the damping unit through a disabled signal.

In one embodiment, the disable unit realizes that the voltage level of the winding voltage is not in the enabled range according to the winding voltage and the reference voltage, the disable unit notifies the logic control unit to disable the damping unit through the disabled signal.

In order to solve the above-mentioned problems, the present disclosure provides a method of operating an oscillation reduction control module. The method of operating the oscillation reduction control module is applied to a power conversion apparatus having a primary side and a secondary side. The primary side is coupled to a power switch. The power conversion apparatus controls the power switch continuously turning on and turning off and converts an input voltage into an output voltage through the primary side and the secondary side. The method includes steps of: receiving the output voltage and a winding voltage at a secondary-side winding of the secondary side, comparing the winding voltage and a threshold voltage corresponding to the output voltage, and providing an activation signal representing that the winding voltage starts to generate an oscillation according to a result of comparing the winding voltage with the threshold voltage, comparing the winding voltage and a reference voltage, and providing a trigger signal representing that a damper is provided according to a result of comparing the winding voltage with the reference voltage, determining whether a voltage level of the winding voltage is in an enabled range set by the reference voltage according to the activation signal and the trigger signal, and enabling a damping unit when the voltage level of the winding voltage so that the damping unit provides a damper to the secondary-side wining to reduce an amplitude of the winding voltage.

In one embodiment, the method further includes a step of: enabling the damping unit only when the voltage level of the winding voltage reaches to the enabled range for the first time.

In one embodiment, the method includes steps of: setting a predetermined counting number, counting the number of times of the oscillation after the winding voltage starts to generate the oscillation, and providing the activation signal representing that the number of times of the oscillation reaches to the predetermined counting number when the number of times of the oscillation reaches to the predetermined counting number.

In one embodiment, the method further includes steps of: detecting whether a path between an output end of providing the output voltage and the secondary-side winding is open-circuit, and enabling the damping unit when the path is open-circuit and the voltage level of the winding voltage is in the enabled range.

In one embodiment, the method further includes steps of: disabling the damping unit when a path between the output end and the secondary-side winding is connected according to the winding voltage and the output voltage or when the power switch is turned on, and disabling the damping unit when the voltage level of the winding voltage is not in the enabled range according to the winding voltage and the reference voltage.

The main purpose and effect of the present disclosure is to use the oscillation reduction control module to detect whether the winding voltage generates the resonance voltage, and when the winding voltage generates the resonance voltage, the damper is provided to rapidly and significantly decay the amplitude of the winding voltage in one resonance period without gradually decaying in the underdamping manner. By reducing the amplitude of the resonance voltage, the electromagnetic interference (EMI) of the power conversion apparatus is reduced so that the power conversion apparatus meets safety standards in the full frequency band.

In addition, the oscillation reduction control module has the programmable design, which can accurately control the damping parameters and delay time, and even has functions of light-load frequency hopping and shutdown, further no external passive components, such as resistors or capacitors are required. Moreover, based on the similar pin as the primary-side controller of the transformer, the oscillation reduction control module can be integrated into the secondary-side controller. The circuit parameters can be set and burned by the digital controller and the features of high confidentiality and common circuit design so it can be planned to apply different damping parameters under different load conditions to achieve the advantages of both high efficiency and EMI suppression.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows:

FIG. 6A is a schematic waveform of the power conversion apparatus according to a first embodiment of the present disclosure.

FIG. 6C is a schematic waveform of the power conversion apparatus according to a third embodiment of the present disclosure.

DETAILED DESCRIPTION

Figure 1:
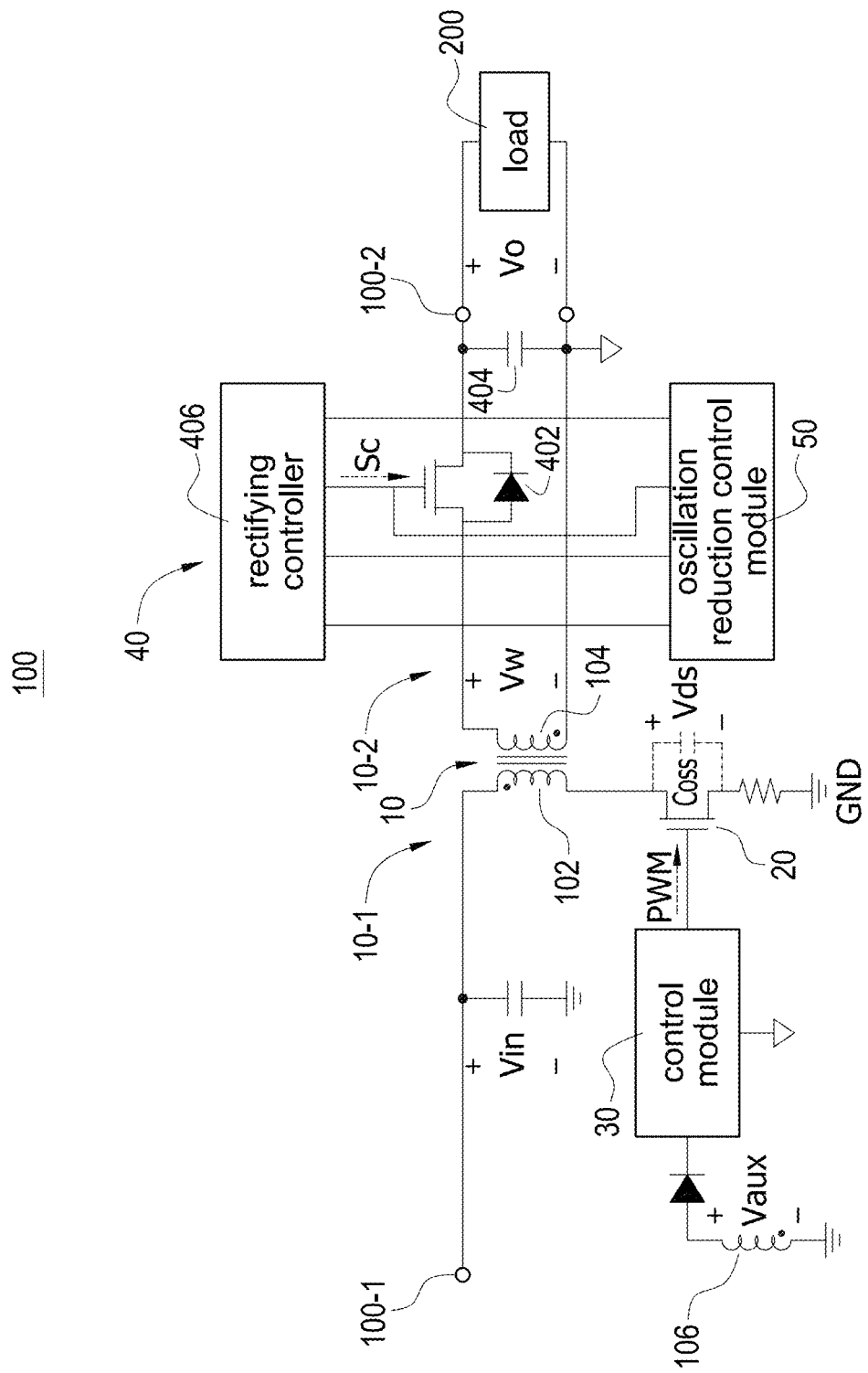
FIG. 1 is a block circuit diagram of a power conversion apparatus with oscillation reduction according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power conversion apparatus with oscillation reduction according to the present disclosure. The power conversion apparatus 100 receives an input voltage Vin through an input end 100-1 and provides an output voltage Vo through an output end 100-2 to supply power to a load 200. The power conversion apparatus 100 includes a transformer 10, a power switch 20, a control module 30, a rectifying module 40, and an oscillation reduction control module 50. The transformer 10 has a primary side 10-1 and a secondary side 10-2. The primary side 10-1 includes a primary-side winding 102, and one end of the primary-side winding 102 receives the input voltage Vin through the input end 100-1 and the other end of the primary-side winding 102 is coupled to the power switch 20. The secondary side 10-2 includes a secondary-side winding 104, and the secondary-side winding 104 is coupled to the rectifying module 40 and the output end 100-2.

The control module 30 is coupled to the power switch 20, and provides a PWM (pulse-width modulation) signal PWM to control the power switch 20 continuously turning on and turning off so as to convert the input voltage Vin into the output voltage Vo from the primary side 10-1 to the secondary side 10-2 of the transformer 10, and the output voltage Vo is provided to supply power to the load 200 through the output end 100-2. The rectifying module 40 includes a rectifying switch 402, an output capacitor 404, and a rectifying controller 406. One end of the rectifying switch 402 is coupled to the secondary-side winding 104 and the other end of the rectifying switch 402 is coupled to the output capacitor 404 and the output end 100-2. The output capacitor 404 stores the output voltage Vo and provides the output voltage Vo to the load 200 through the output end 100-2. The rectifying controller 406 is coupled to the rectifying switch 402 and provides a control signal Sc to continuously turn on and turn off the rectifying switch synchronously with the power switch 20, thereby reducing the power loss of the rectifying module 40 and increasing the operating efficiency of the power conversion apparatus 100. In the present disclosure, the determination of the oscillation reduction control can be implemented by turning on and turning off the rectifying switch 402, the detailed description will be made hereinafter.

Figure 2:
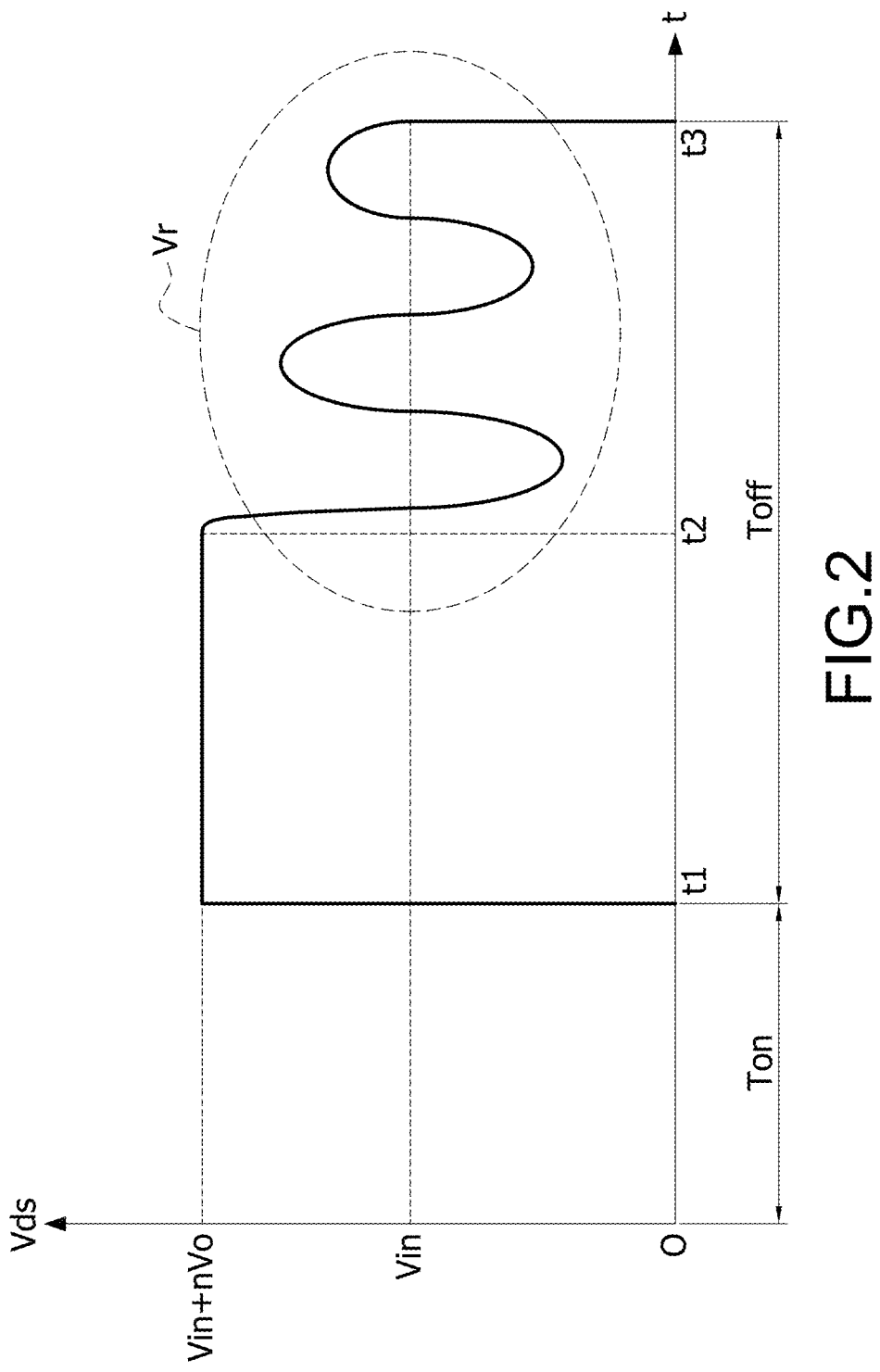
FIG. 2 is a schematic voltage waveform of power switch in one cycle according to the present disclosure.

The oscillation reduction control module 50 is coupled to the secondary side 10-2. When the oscillation reduction control module 50 detects a resonance voltage through the secondary side 10-2, the oscillation reduction control module 50 performs an oscillation reduction operation to the resonance voltage to reduce an amplitude of the resonance voltage by a damper. Please refer to FIG. 2, which shows a schematic voltage waveform of power switch in one cycle according to the present disclosure, and also refer to FIG. 1. As shown in FIG. 2, the control module 30 controls the power conversion apparatus 100 operating in a discontinuous conduction mode (DCM). When the control module 30 turns on the power switch 20, a voltage Vds across the power switch 20 is about 0 volt. When the control module 30 turns off the power switch 20 at time t1, a drain-source voltage is substantially maintained at the input voltage Vin plus n times the output voltage Vo, in which n is a turn ratio between the primary-side winding 102 and the secondary-side winding 104. When the control module 30 turns off the power switch 20 at time t2, the energy stored in the magnetizing inductance of the primary-side winding 102 has been completely released so that a current flowing through the secondary side 10-2 is completely zero and the secondary side 10-2 is open-circuit. At this condition, the primary side 10-1 forms an RLC resonance tank (composed of the wire resistance, the magnetizing inductance of the primary-side winding 102, and the parasitic capacitance Coss of the power switch 20) to generate the resonance operation. In the resonance operation, it oscillates back and forth with the input voltage Vin as the center point, and the amplitude gradually decays in an underdamping manner. The back and forth oscillating voltage is referred to as a resonance voltage Vr. Therefore, when the power switch 20 is turned off at time t1 and the energy stored in the magnetizing inductance has been completely released, the primary side 10-1 of the transformer 10 generates the resonance voltage Vr. The resonance voltage Vr can be detected through the voltage Vds across the power switch 20, the winding voltage Vw at the secondary-side winding 104, or an auxiliary voltage Vaux at an auxiliary winding 106. Therefore, the amplitude of the resonance voltage Vr can be reduced by performing the oscillation reduction operation for the three voltage points.

The main purpose and effect of the present disclosure are that: the oscillation reduction control module 50 is coupled to the secondary side 10-2 to detect whether the winding voltage Vw oscillates (i.e., whether the winding voltage Vw generates the resonance voltage Vr). When the winding voltage Vw oscillates, the oscillation reduction control module 50 provides a damper so that the resonance voltage Vr no longer gradually decays in the underdamping manner but significantly (rapidly) decays in one resonance period (i.e., the oscillation reduction operation is implemented). By reducing the amplitude of the resonance voltage Vr, the electromagnetic interference (EMI) of the power conversion apparatus 100 is reduced so that the power conversion apparatus 100 meets safety standards in the full frequency band. In one embodiment, the purpose of the oscillation reduction operation for the winding voltage Vw by the oscillation reduction control module 50 is a better voltage waveform of the winding voltage Vw, corresponding to a voltage waveform of the primary side 10-1 when the power switch 20 is turned off, can be acquired through the electrical isolation of the transformer 10. Moreover, the oscillation reduction control module 50 also can perform the oscillation reduction operation for the voltage Vds or the auxiliary voltage Vaux, and the coupling and detection positions will also accordingly change. In one embodiment, the power conversion apparatus 100 may be, for example but not limited to, a flyback converter. As long as a converter that generates the resonance voltage Vr as shown in FIG. 2 when the power switch 20 is turned on or turned off, the oscillation reduction control module 50 can be used for the converter to perform the oscillation reduction operation.

As shown in FIG. 1, since the more suitable coupling position of the oscillation reduction control module 50 is the secondary side 10-2 of the power conversion apparatus 100, the coupling and detection positions of the oscillation reduction control module 50 are similar to those of the rectifying controller 406. At this condition, the oscillation reduction control module 50 can be integrated with the rectifying controller 406 so as to provide the oscillation reduction operation according to the resonance voltage Vr when the rectifying controller 406 turns off the rectifying switch 402. Due to the integration of the oscillation reduction control module 50 and the rectifying controller 406, the overall circuit volume of the power conversion apparatus 100 can be reduced, and the rectifying controller 406 and the oscillation reduction control module 50 can use the same signal to perform synchronous operations, thereby increase the system stability of the power conversion apparatus 100.

Figure 3:
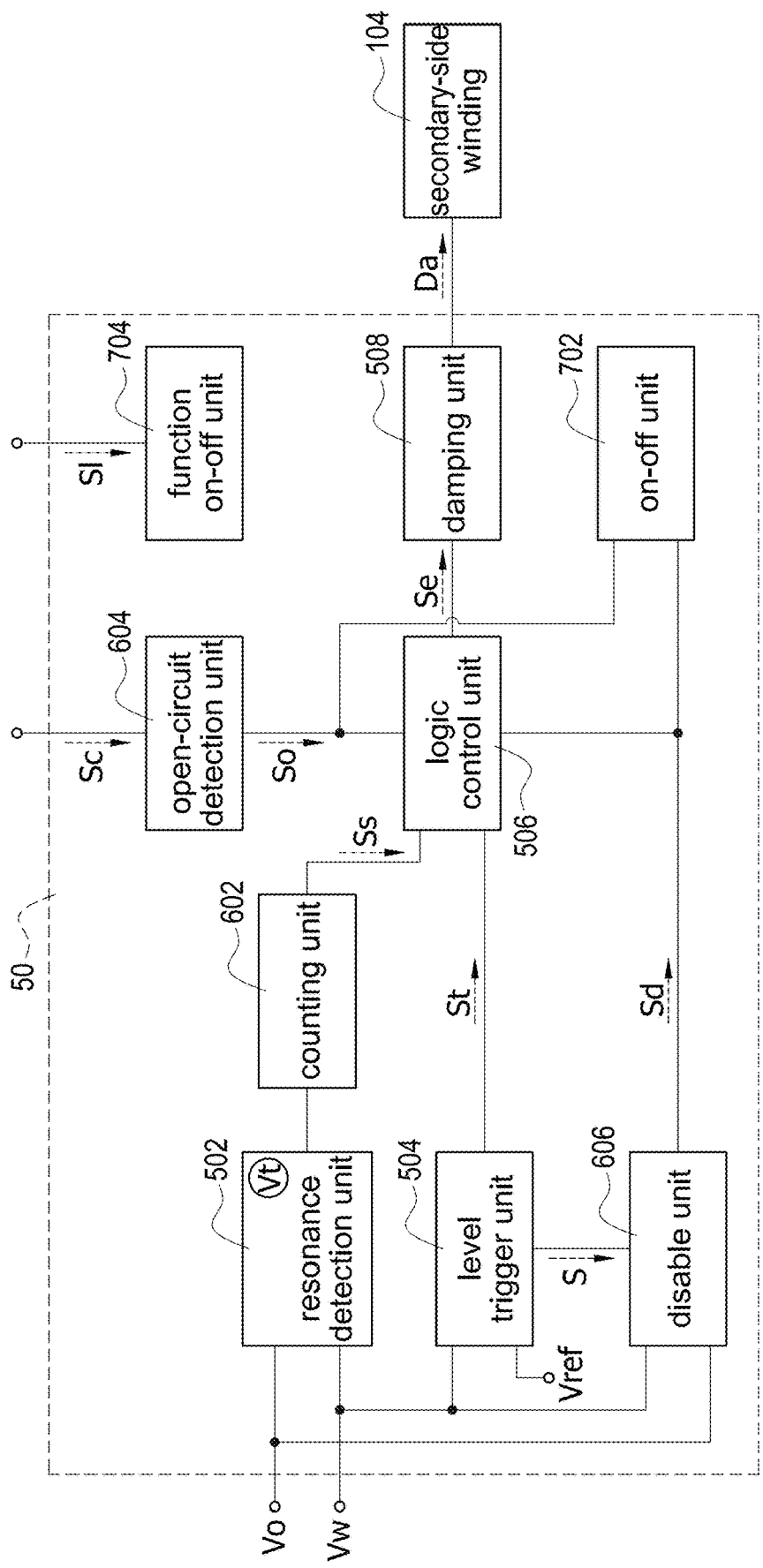
FIG. 3 is a block diagram of an oscillation reduction control module according to the present disclosure.

Please refer to FIG. 3, which shown a block diagram of an oscillation reduction control module according to the present disclosure, and also refer to FIG. 1 and FIG. 2. The oscillation reduction control module 50 includes a resonance detection unit 502, a level trigger unit 504, a logic control unit 506, and a damping unit 508. The logic control unit 506 is coupled to the resonance detection unit 502, the level trigger unit 504, and the damping unit 508. The resonance detection unit 502 receives the output voltage Vo and the winding voltage Vw, and compares the winding voltage Vw with a threshold voltage Vt corresponding to the output voltage Vo so as to realize whether the winding voltage Vw oscillates, that is, generates the resonance voltage Vr. In one embodiment, the threshold voltage Vt can be set as a proportional multiple of the output voltage Vo, for example but not limited to 0.8 times the output voltage Vo. When the winding voltage Vw is greater than the threshold voltage Vt, it means that the energy stored in the magnetizing inductance on the primary-side winding 102 has not been released yet. When the winding voltage Vw is less than the threshold voltage Vt, it means that the energy stored in the magnetizing inductance on the primary-side winding 102 has been completely released, and therefore the voltage on the primary side 10-1 starts to oscillate.

The resonance detection unit 502 provides an activation signal Ss to the logic control unit 506 according to the comparison result, and the level change of the activation signal Ss represents whether the winding voltage Vw starts to oscillate. In one embodiment, since a voltage level (usually within ten volts) that the controller (may include the control module 30, the rectifying controller 406, and the oscillation reduction control module 50) can accept is usually much lower than a voltage level (usually hundreds of volts) on a main path of the power conversion apparatus 100, the voltage (such as the winding voltage Vw, the output voltage Vo, or son) on the main path of the power conversion apparatus 100 received or detected by the controller may need to be proportionally stepped down to a voltage level that the controller can withstand. However, for the sake of convenience, the conventional step-down technology is omitted here for conciseness.

The level trigger unit 504 receives the winding voltage Vw, and compares the winding voltage Vw with a reference voltage Vref to realize whether the voltage level of the resonance voltage Vr reaches an enabled range so as to enable the damping unit 508 to provide the damper Da. In particular, the reference voltage Vref is used to set the enabled range, for example but not limited to, the reference voltage Vref is set at 0 volt. When the voltage level of the resonance voltage Vr is positive (greater than 0 volt), the damping unit 508 is enabled, and the damping unit 508 is not enabled when the resonance voltage Vr is negative (less than 0 volt). Alternatively, when the voltage level of the resonance voltage Vr is positive (greater than 0 volt), the damping unit 508 is not enabled, and the damping unit 508 is enabled when the resonance voltage Vr is negative (less than 0 volt). The level trigger unit 504 provides a trigger signal St to the logic control unit 506 according to the comparison result, and the level change of the trigger signal St represents the opportunity to provide the damper Da. However, the logic control unit 506 still includes other logic determination mechanisms. Therefore, even if the level trigger unit 504 determines that opportunity to provide the damper Da has come, the logic control unit 506 still needs to further confirm whether it is necessary to control the damping unit 508 to provide the damper Da. In particular, the level trigger unit 504 can set the enabled range in the positive half cycle of the resonance voltage Vr, the negative half cycle of the resonance voltage Vr, or both the positive and negative half cycles of the resonance voltage Vr. Also, when the winding voltage Vw reaches to the enabled range set by the reference voltage Vref, single, multiple, or continuous triggers can be set in the positive and/or negative half cycle(s), and the size of the enabled range is determined by the reference voltage Vref.

The logic control unit 506 receives the activation signal Ss and the trigger signal St, and determines whether the damping unit 508 is enabled according to the activation signal Ss and the trigger signal St. The damping unit 508 is coupled between the logic control unit 506, the secondary-side winding 104, and a ground point GND, and receives an enabled signal Se provided from the logic control unit 506. The logic control unit 506 enables the damping unit 508 through the enabled signal Se, the damping unit 508 provides the damper Da to reduce an amplitude of the resonance voltage Vr so as to reduce the amplitude of the voltage at the primary side 10-1 due to the coupling of the transformer 10.

The logic control unit 506 includes two ways to enable the damping unit 508. The first one is that the damping unit 508 is enabled when the voltage level of the resonance voltage Vr reaches to the enabled range. The logic control unit 506 enables the damping unit 508 when the voltage level of the resonance voltage Vr in one half cycle (for example, the positive half cycle or the negative half cycle); the logic control unit 506 disables the damping unit 508 when the voltage level of the resonance voltage Vr in the other half cycle. The advantage of this control manner is that the amplitude of the resonance voltage Vr can be rapidly recued to a very low level to facilitate the suppression of the electromagnetic interference (EMI). The second one is that the damping unit is enabled by the logic control unit 506 only when the voltage level of the resonance voltage Vr reaches to the enabled range for the first time, and the damping unit 508 is not enabled again. In this control manner, after the damping unit 508 is enabled for the first time, the amplitude of the resonance voltage Vr can be reduced below a certain amplitude, and the subsequent amplitude of the resonance voltage Vr will no longer exceed this amplitude. The advantage of this control manner is that the one-time enabling the damping unit 508 can save the power consumption of the oscillation reduction control module 50, thereby increasing the overall operation efficiency of the power conversion apparatus 100. Further, the resonance voltage Vr with lower amplitude can still make the electromagnetic interference (EMI) of the power conversion apparatus 100 comply with safety regulations. The operator can adjust the number of times of enabling the damping unit 508 according to the actual needs.

Figure 4B:
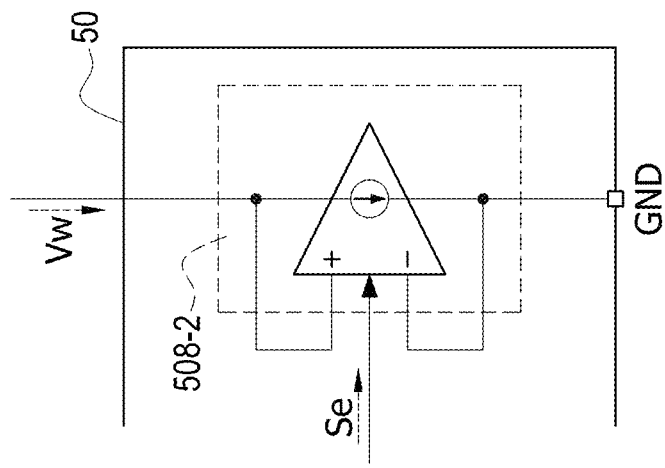
FIG. 4B is a block circuit diagram of the damping unit according to a second embodiment of the present disclosure.
Figure 4A:
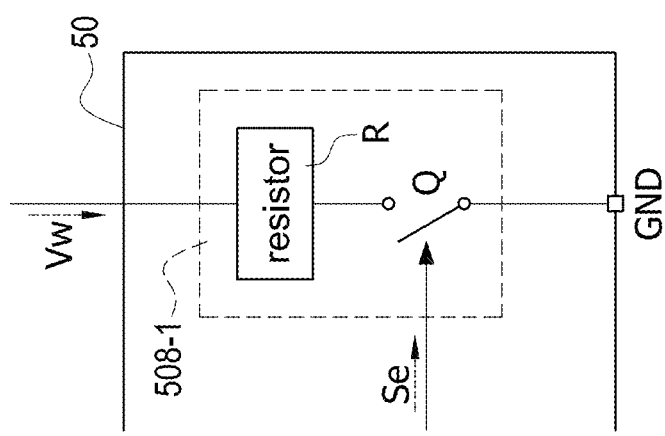
FIG. 4A is a block circuit diagram of a damping unit according to a first embodiment of the present disclosure.

The damping unit 508 has various embodiments, for example but not limited to, a switch Q is cooperated with a resistor R as shown in FIG. 4A, the switch Q of the damping unit 508-1 is enabled (turned on) by the enabled signal Se to make the resistor R provide the damper Da. Alternatively, a voltage-controlled current source shown in FIG. 4B is used and the enabled signal Se enables an active damper, i.e., a damping unit 508-2 to make the active damper provide the damper Da in a form of current source. Specifically, the higher the voltage level of the winding voltage Vw, the higher the current. The ratio between the current and the voltage can be designed based on a current mirror set by digital parameters, and the higher the gain ratio, the stronger the suppression effect of the damper Da. Alternatively, the damping unit 508 can be an apparatus capable of providing the damper Da, such as an analog equivalent resistor, an electric energy to thermal energy converter, a constant current source, and so on, which can be driven by receiving the enabled signal Se. Therefore, the type of the damping unit 508 is not limited here, as long as the apparatus that can provide the damper Da should be intended to be embraced within the scope of the present disclosure.

Please refer to FIG. 3 again. The oscillation reduction control module 50 further includes a counting unit 602, an open-circuit detection unit 604, and a disable unit 606. The counting unit 602 is coupled to the resonance detection unit 502 and the logic control unit 506, and the counting unit 602 sets a predetermined counting number. When the winding voltage Vw is less than the threshold voltage Vt, it means that the winding voltage Vw starts to generate the resonance voltage Vr to oscillate so that the counting unit 602 starts to count the oscillation. When the counting unit 602 counts once, it means that the resonance voltage Vr generates an oscillation wave. When the number of times of counting provided by the counting unit 602 reaches to the predetermined counting number, the counting unit 602 provides the activation signal Ss representing that the oscillation number of the resonance voltage Vr reaches to the predetermined counting number. That is, when the oscillation number of the resonance voltage Vr reaches to the predetermined counting number, the counting unit 602 changes the level of the activation signal Ss to inform the logic control unit 506 that the oscillation number of the resonance voltage Vr has reached the predetermined counting number. Accordingly, the oscillation reduction control module 50 can flexibly activate the oscillation reduction operation when the resonance voltage Vr needs to reach to a certain oscillation wave.

The open-circuit detection unit 604 is coupled to the logic control unit 506 and the secondary side 10-2, and detects whether a path between the output end 100-2 and the secondary-side winding 104 is open (disconnected) or not to provide an open-circuit signal So to the logic control unit 506. Under the normal operation of the power conversion apparatus 100, there are only two possibilities for disconnection. The first one is that the power switch 20 is turned on and the rectifying switch 402 is synchronously turned off. At this condition, the magnetizing inductance of the primary-side winding 102 is storing energy, and the voltage Vds across the power switch 20 is 0 volt. The second one is that after the rectifying switch 402 is synchronously turned on (at this time, the power switch 20 is turned off), the energy stored in the magnetizing inductance of the primary-side winding 102 has been completely released so that the current flowing through the secondary side 10-2 is completely zero. At this condition, the rectifying switch 402 is turned off so that the path between the output end 100-2 and the secondary-side winding 104 is open-circuit. In particular, the design of the open-circuit detection unit 604 is mainly prevent the oscillation reduction control module 50 from performing the oscillation reduction operation when the rectifying switch 402 is turned on since the situation may cause the power conversion apparatus 100 to malfunction and cause the power conversion apparatus 100 to fail.

Therefore, whether the path between the output end 100-2 and the secondary-side winding 104 is open (disconnected) or not can be realized by the control signal Sc provided by the rectifying controller 406 to the rectifying switch 402. In can be determined whether the path between the output end 100-2 and the secondary-side winding 104 is open according to the manner of receiving the control signal Sc by the oscillation reduction control module 50 shown in FIG. 1.

When the path between the output end 100-2 and the secondary-side winding 104 is open and the voltage level of the winding voltage Vw in the enabled range, the logic control unit 506 enables the damping unit 508 so as to perform the oscillation reduction operation for the oscillation of the winding voltage Vw. In one embodiment, not only the control signal Sc can be used to determine whether the path between the output end 100-2 and the secondary-side winding 104 is open-circuit (it is only an easier way to implement). In addition, the voltage changes at various points of the power conversion apparatus 100 may be provided to determine whether the path between the output end 100-2 and the secondary-side winding 104 is open-circuit, and the detailed description is omitted here for conciseness.

The disable unit 606 is coupled to the logic control unit 506, and receives the winding voltage Vw and the output voltage Vo to provide a disabled signal Sd to the logic control unit 506. The disable unit 606 mainly provides a function of avoiding the malfunction of the oscillation reduction control module 50 by determining a voltage difference between the winding voltage Vw and the output voltage Vo. Since the winding voltage Vw is greater than the output voltage Vo when the path between the output end 100-2 and the secondary-side winding 104 is closed (connected), this feature can be used to determine whether the path between the output end 100-2 and the secondary-side winding 104 is closed or not. In particular, in this condition, it should avoid the logic control unit 506 from enabling the damping unit 508. In addition, when the winding voltage Vw is less than the proportional multiple of the output voltage Vo, for example but not limited to −1.2 times the output voltage Vo, it means that the power switch 20 is turned on. Therefore, it is necessary to avoid the logic control unit 506 enabling the damping unit 508 in this situation. When the above-mentioned two conditions occur, the disable unit 606 changes the level of the disabled signal Sd and informs the logic control unit 506 so that the logic control unit 506 disables the damping unit 508.

Moreover, the disable unit 606 may be coupled to the level trigger unit 504 so as to provide a disabled control for the oscillation reduction control module 50 in operation. Specifically, after the resonance detection unit 502 informs the logic control unit 506 to activate the oscillation reduction control module 50, the disable unit 606 informs the logic control unit 506 through the disabled signal Sd (it is contrary to the operation logic of the level trigger unit 504) when the disable unit 606 realizes that the voltage level of the winding voltage Vw is not in the enabled range (the level trigger unit 504 informs the disable unit 606 through another signal S) according to the winding voltage Vw and the reference voltage Vref. Moreover, the disable unit 606 can also provide the disabled control according to the limitation of the enabled times of the damping unit 508. For example, the logic control unit 506 enables the damping unit 508 only when the voltage level of the winding voltage Vr (corresponding to the resonance voltage Vr) reaches to the enabled range for the first time. Also, the disable unit 606 notifies the logic control unit 506 through the disabled signal Sd to no longer enable the damping unit 508 again.

Please refer to FIG. 3 again, the oscillation reduction control module 50 further includes an on-off unit 702 and a function on-off unit 704. The on-off unit 702 receives the open-circuit signal So and the disabled signal Sd, and enables the oscillation reduction control module 50 when the path between the output end 100-2 and the secondary-side winding 104 is disconnected (realized by the open-circuit signal So) or disables the oscillation reduction control module 50 when the damping unit 508 is disabled by the disabled signal Sd. Therefore, the oscillation reduction control module 50 is activated when the resonance voltage Vr needs to perform the oscillation reduction operation, and the oscillation reduction control module 50 is disabled when the oscillation reduction control module 50 is not needed, thereby reducing the overall consumption of the power conversion apparatus 100 and increasing the operation efficiency of the power conversion apparatus 100.

The function on-off unit 704 is coupled to the power conversion apparatus 100 and receives a load signal Sl related to the loading of the load 200. When the function on-off unit 704 realizes that the loading in a specific range, for example but not limited to no load, the oscillation reduction control module 50 is activated to operate the oscillation reduction operation. The load signal Sl can be realized by the feedback of the output voltage Vo, the switching frequency of the power switch 20, or signals provided by the control module 30 or the load 200. Also, the loading of the load 200 can be realized by the calculation of the function on-off unit 704 or the notification of external apparatuses, such as but not limited to the control module 30 or the load 200. Specifically, under the heavy-load condition, the control module 30 controls the power conversion apparatus 100 to work (operate) in a continuous conduction mode (CCM) or a critical conduction mode (CRM). Therefore, the primary side 10-1 does not generate the resonance voltage Vr and the oscillation reduction control module 50 is not used for the oscillation reduction operation. Under the light-load condition, the control module 30 usually controls the power conversion apparatus 100 to work (operate) in a discontinuous conduction mode (DCM). Preferably, the control module 30 may control the power conversion apparatus 100 to work (operate) in a quasi-resonant (QR) control mode to have better efficiency than using the oscillation reduction control module 50 to reduce the amplitude of the resonance voltage Vr. Therefore, it is more suitable to work in the QR control mode under the light-load condition.

However, under the no-load condition (or close to the no-load condition), the use of QR control mode has less improvement in efficiency. Also, if the QR control mode is not used and the resonance voltage Vr continuous to oscillate, the electromagnetic interference (EMI) will be increased. Therefore, under the no-load condition, it is a better choice to use to oscillation reduction control module 50 to reduce the amplitude of the resonance voltage Vr and suppress the EMI. Therefore, when the function on-off unit 704 realizes that the loading in a specific range, for example but not limited to no load, the oscillation reduction control module 50 is activated to operate the oscillation reduction operation, thereby suppressing the EMI. In one embodiment, since the efficiency of continuously oscillating the resonance voltage Vr may be better than that of using the oscillation reduction control module 50 to reduce the amplitude of the resonance voltage Vr, the function on-off unit 704 can be used to disable the oscillation reduction control module 50 without performing the oscillation reduction operation according to actual needs.

Figure 5:
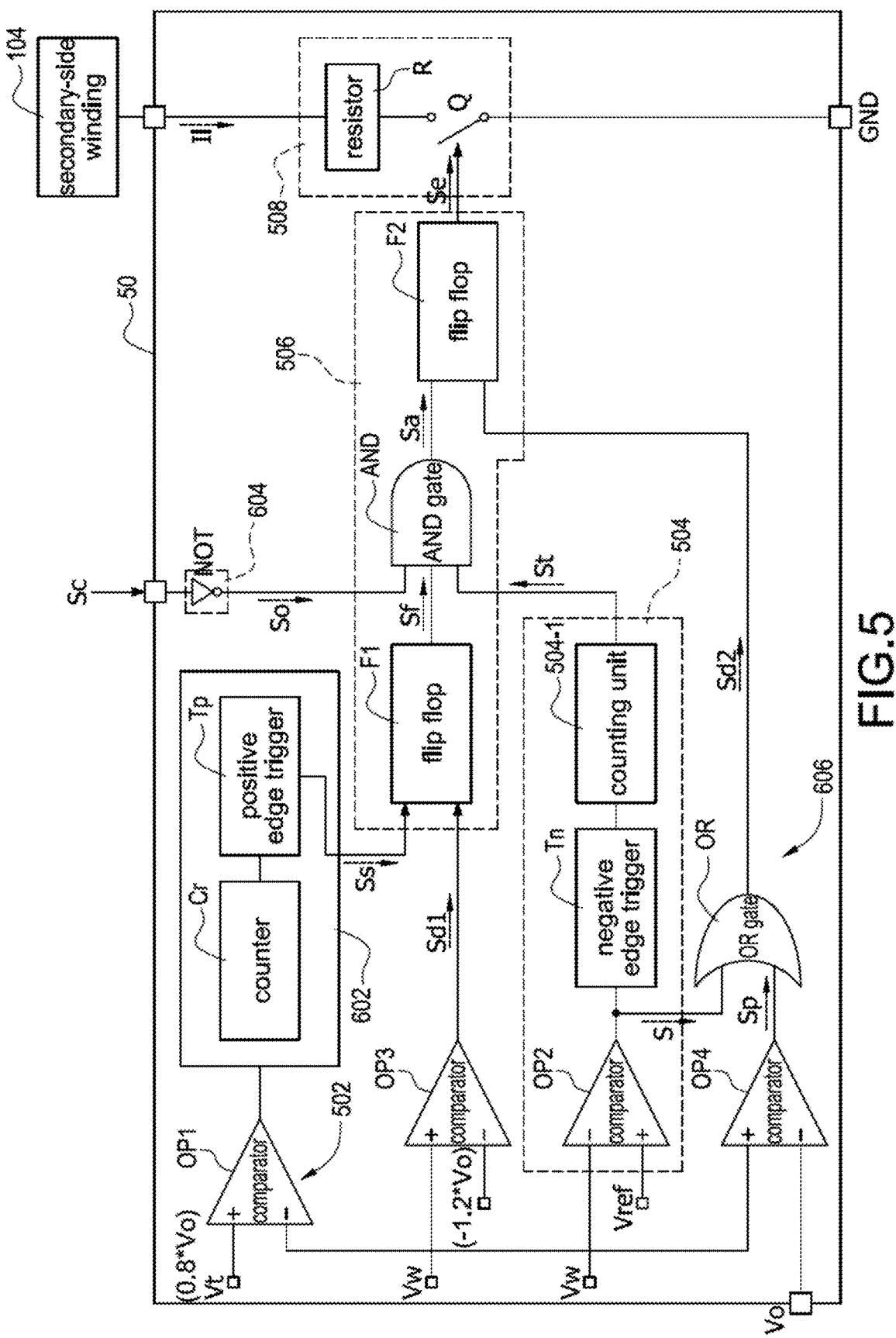
FIG. 5 is a logic circuit diagram of the oscillation reduction control module according to the present disclosure.

Please refer to FIG. 5, which shows a logic circuit diagram of the oscillation reduction control module according to the present disclosure, and also refer to FIG. 1 to FIG. 4B. The control and detection manners of each component shown in FIG. 5 can be implemented by the simplest logic circuit components, for example a comparator can be used to perform the comparison between two voltages. In fact, however, the actual circuit can be formed by a variety of circuits with the same effect. Therefore, the oscillation reduction control module 50 should not be limited to the circuit shown in FIG. 5. In FIG. 5, the resonance detection unit 502 can be formed by a comparator OP1. The comparator OP1 compares the winding voltage Vw with 0.8 times the output voltage Vo, i.e., the threshold voltage Vt. When the winding voltage Vw is less than 0.8 times the output voltage Vo, the comparator OP1 generates a signal with high level. The counting unit 602 can be composed of a counter Cr and a positive edge trigger Tp. The counter Cr sets a predetermined counting number. When the number of times of generating the signal with high level by the comparator OP1 reaches to the predetermined counting number, the counter Cr notifies the positive edge trigger Tp so that the positive edge trigger Tp generates the activation signal Ss in positive edge triggering to the logic control unit 506.

The level trigger unit 504 is composed of a comparator OP2, a negative edge trigger Tn, and a counting unit 504-1. The comparator OP2 is used to compare the winding voltage Vw and a reference voltage Vref of 0 volt. The enabled range is defined by setting the reference voltage Vref to be greater than 0 volt. When the winding voltage Vw is greater than the reference voltage Vref of 0 volt, the comparator OP2 generates a signal with low level, and the negative edge trigger Tn generates a trigger signal St in negative edge triggering according to the transition of the level of the comparator OP2. The counting unit 504-1 receives the trigger signal St and stops providing the trigger signal St with high level to the logic control unit 506 when the counting unit 504-1 counts the number of times of transiting to high level of the trigger signal St reaches to the predetermined counting number. Therefore, the number of times of providing the damper Da by the damping unit 508 can be set. When the power saving is required, the damper Da can be provided only once. In addition, the counting unit 504-1 can set the enabled range in the positive half cycle of the resonance voltage Vr, the negative half cycle of the resonance voltage Vr, or both the positive and negative half cycles of the resonance voltage Vr. Also, when the trigger signal St is transited from the low level to the high level, the trigger signal St can be set to a single, multiple, or continuous trigger signal.

The open-circuit detection unit 604 may be a NOT gate. When the control signal Sc in the low level, the open-circuit detection unit 604 outputs the open-circuit signal So with high level, and the high-level open-circuit signal So means that the rectifying switch 402 is turned off. The disable unit 606 is composed of comparators OP3, OP4 and an OR gate. The disabled signal Sd provided by the disable unit 606 includes a first disabled signal Sd1 and a second disabled signal Sd2. The comparator OP3 compares the winding voltage Vw with −1.2 times the output voltage Vo, and provides the first disabled signal Sd1 to the logic control unit 506. When the winding voltage Vw is less than −1.2 times the output voltage Vo, it means that the power switch 20 is turned on, and the comparator OP3 provides the first disabled signal Sd1 with high level to the logic control unit 506.

The logic control unit 506 includes flip flops F1, F2 and an AND gate, and the flip flop F1 receives the activation signal Ss and the first disabled signal Sd1. When the activation signal Ss is high-level (that is, the winding voltage Vw generates the resonance voltage Vr and starts to oscillate) and the first disabled signal Sd1 is low-level (that is, the power switch 20 is turned off), an output signal Sf of the flip flop F1 is high (1) logic level. The AND gate of the logic control unit 506 receives the output signal Sf of the flip flop F1, the open-circuit signal So, and the trigger signal St, and when the three signals Sf, So, St are all high (1) logic level, the AND gate provides an output signal Sa with high level to the flip flop F2.

The comparator OP4 receives the winding voltage Vw and the output voltage Vo, and is used to compare the winding voltage Vw and the output voltage Vo to provides an output signal Sp to the OR gate. When the path between the output end 100-2 and the secondary-side winding 104 is connected, the winding voltage Vw is greater than the output voltage Vo, and therefore the comparator OP4 provides the output signal Sp with high level. In addition, the output end of the comparator OP2 is coupled to the OR gate. When the voltage level of the winding voltage Vw is not in the enabled range according to the comparison result between the winding voltage Vw and the reference voltage Vref of 0 volt, the comparator OP2 outputs a signal S with high level. When the voltage level of the winding voltage Vw is not in the enabled range or the winding voltage Vw is greater than the output voltage Vo, the second disabled signal Sd2 outputted from the OR gate is high-level. The flip flop F2 receives the output signal Sa outputted from the AND gate and the second disabled signal Sd2 outputted from the OR gate. When the output signal Sa is high (1) logic level, the flip flop F2 provides the enabled signal Se with high level to enable a switch Q of the damping unit 508 to make the resistor R of the damping unit 508 provide the damper Da so as to generate the path current Il flowing from the secondary-side winding 104 to the ground point GND. When the second disabled signal Sd2 is high (1) logic level, the flip flop F2 provides the enabled signal Se with low level to disable the switch Q of the damping unit 508.

The oscillation reduction control module 50 can be implemented by the above-mentioned physical components, further the oscillation reduction control module 50 can also be designed with a programmable controller. The advantage of using the programmable controller to design the oscillation reduction control module 50 is that all internal parameters, including the damper Da, the reference voltage Vref, etc. of the oscillation reduction control module 50 can be adjusted.

Figure 6B:
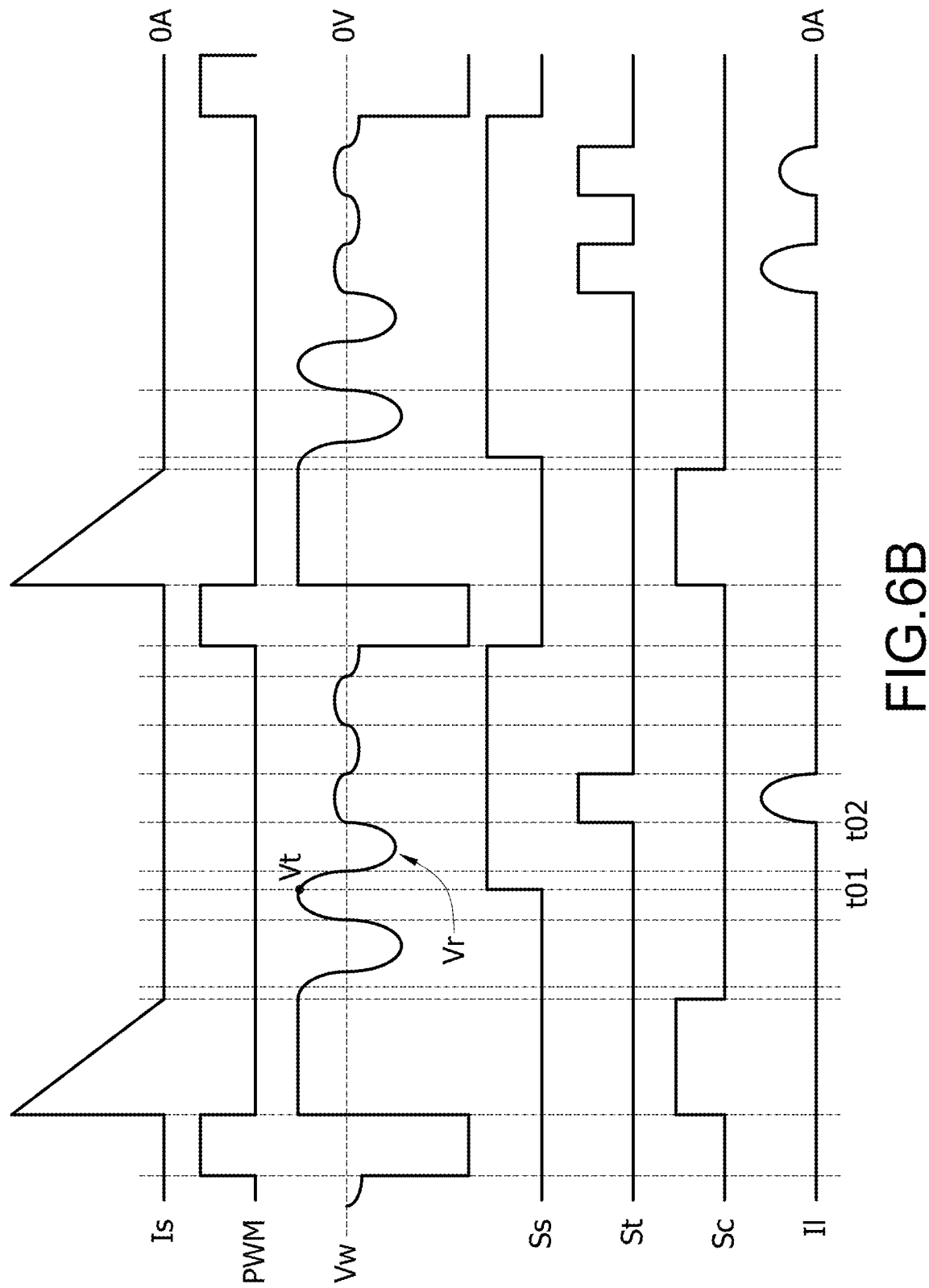
FIG. 6B is a schematic waveform of the power conversion apparatus according to a second embodiment of the present disclosure.

Please refer to FIG. 6A, FIG. 6B, and FIG. 6C, which show schematic waveforms of the power conversion apparatus according to a first embodiment, a second embodiment, and a third embodiments of the present disclosure, respectively, and also refer to FIG. 1 to FIG. 5. In the embodiment shown in FIG. 6A, the damping unit 508 is activated (enabled) at the first oscillation wave of the resonance voltage Vr, and the enabled range is set during the positive half cycle of the resonance voltage Vr, and the number of times of providing the damper Da by the damping unit 508 is not limited. In the embodiment shown in FIG. 6B, the damping unit 508 is activated (enabled) after the first oscillation wave of the resonance voltage Vr, and the enabled range is set during the positive half cycle of the resonance voltage Vr, and the number of times of providing the damper Da by the damping unit 508 is once. In the embodiment shown in FIG. 6C, the damping unit 508 is activated (enabled) at the first oscillation wave of the resonance voltage Vr, and the enabled ranged is set during both the positive half cycle and the negative half cycle of the resonance voltage Vr.

As shown in FIG. 6A when the power switch 20 is turned off by a PWM signal PWM at time t1, the control signal Sc turns on the rectifying switch 402. At this condition, a current flowing through a resonance inductor at the primary side 10-1 starts to decrease so that a secondary-side current Is sensed at the secondary-side winding 104 starts to decrease, and the winding voltage Vw is corresponding to a voltage Vds across the power switch 20. Also, the activation signal Ss and trigger signal St are low-level so that the enabled signal Se is also low-level. The energy stored in the magnetizing inductance of the primary-side winding 102 has been completely released, and when the secondary-side current Is completely zero at time t2, the control signal Sc turns off the rectifying switch 402. At this condition, the winding voltage Vw starts to generate the resonance voltage Vr and therefore starts to decreased. Also, the activation signal Ss and the trigger signal St are still low-level so that the enabled signal Se is still also low-level.

When the winding voltage Vw decreases to below (be less than) the threshold voltage Vt at time t3, the activation signal Ss is high-level. Since the winding voltage Vw is not less than or equal to the reference voltage Vref of 0 volt set by the level trigger unit 504, the trigger signal St is still low-level so that the enabled signal Se is still also low-level. When the resonance voltage Vr rises from the negative half cycle to above the reference voltage Vref of 0 volt at time t4, the activation signal Ss and the trigger signal St are both high-level so that the enabled signal Se is transited from the low level to the high level, thereby triggering the damping unit 508. At this condition, the damping unit 508 provides the damper Da to reduce the amplitude of the resonance voltage Vr, and generates the path current Il between the secondary-side winding 104 to the ground point GND through the damping unit 508. After time t4, as long as the resonance voltage Vr rises from the negative half cycle to above the reference voltage Vref of 0 volt, the activation signal St is transited from the low level to the high level. In the enabled range, therefore, the logic control unit 506 controls the damping unit 508 to provide the damper Da, that is, the trigger signal St is high level in the positive half cycle of the resonance voltage Vr.

The difference between FIG. 6B and FIG. 6A is that the oscillation reduction control module 50 uses the counting unit 602 to count the number of times of oscillation of the resonance voltage Vr, and after the first oscillation wave of the resonance voltage Vr, the winding voltage Vw decreases below the threshold voltage Vt and the activation signal Ss with high level is provided at time t01. Since the winding voltage Vw is not less than or equal to the reference voltage Vref of 0 volt set by the level trigger unit 504, the trigger signal St is still low-level so that the enabled signal Se is still also low-level. When the resonance voltage Vr rises from the negative half cycle to above the reference voltage Vref of 0 volt at time t02, the activation signal Ss and the trigger signal St are both high-level so that the enabled signal Se is transited from the low level to the high level, thereby triggering the damping unit 508. At this condition, the damping unit 508 provides the damper Da to reduce the amplitude of the resonance voltage Vr, and generates the path current Il between the secondary-side winding 104 to the ground point GND through the damping unit 508. Since the damping unit 508 is limited to provide the damper Da only once, the trigger signal St is no longer transited from the low level to the high level after time t02 so that the damping unit 508 no longer provides the damper Da.

The difference between FIG. 6C and FIG. 6A is that the enabled ranged is set by the level trigger unit 504 during both the positive half cycle and the negative half cycle of the resonance voltage Vr. When the resonance voltage Vr rises from the negative half cycle to above the reference voltage Vref of 0 volt at time t11, the activation signal Ss and the trigger signal St are both high-level so that the enabled signal Se is transited from the low level to the high level, thereby triggering the damping unit 508. At this condition, the damping unit 508 provides the damper Da to reduce the amplitude of the resonance voltage Vr, and generates the path current Il between the secondary-side winding 104 to the ground point GND through the damping unit 508. Since the enabled range includes the positive half cycle and the negative half cycle of the resonance voltage Vr, the trigger signal St remains at high level after time t11 so that the damping unit 508 continuously provides the damper Da.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion apparatus with oscillation reduction control configured to supply power to a load through an output end, the power conversion apparatus comprising:
   a transformer having a primary side and a secondary side coupled to the output end, the primary side configured to receive an input voltage,
   a power switch coupled to the primary side,
   a control module coupled to the power switch, and configured to control the power switch continuously turning on and turning off, convert the input voltage into an output voltage through the transformer, and provide the output voltage through the output end, and
   an oscillation reduction control module coupled to the secondary side,
   wherein when the oscillation reduction control module detects a resonance voltage through the secondary side, the oscillation reduction control module performs an oscillation reduction operation to the resonance voltage to reduce an amplitude of the resonance voltage by a damper;
   wherein the oscillation reduction control module acquires a winding voltage by detecting a secondary-side winding of the secondary side, and the winding voltage generates the resonance voltage when the power switch is turned off; the oscillation reduction control module determines whether the winding voltage is the resonance voltage according to the winding voltage and the output voltage; and
   wherein the oscillation reduction control module comprises:
      a resonance detection unit configured to receive the output voltage and the winding voltage, compare the winding voltage with a threshold voltage corresponding to the output voltage, and provide an activation signal representing that the winding voltage starts to generate an oscillation according to a result of comparing the winding voltage with the threshold voltage,
      a level trigger unit configured to receive the winding voltage, compare the winding voltage with a reference voltage, and provide a trigger signal representing that the damper is provided according to a result of comparing the winding voltage with the reference voltage,
      a logic control unit configured to receive the activation signal and the trigger signal,
      a damping unit coupled to the logic control unit and the secondary-side winding, wherein the logic control unit enables the damping unit when a voltage level of the winding voltage is in an enabled range set by the reference voltage so that the damping unit provides the damper to the secondary-side winding; and a counting unit coupled to the resonance detection unit and the logic control unit, wherein the counting unit sets a predetermined counting number, and starts to count the number of times of the oscillation after the oscillation is generated by the winding voltage; when the number of times of the oscillation reaches to the predetermined counting number, the counting unit provides the activation signal representing that the number of times of the oscillation reaches to the predetermined counting number.

2. The power conversion apparatus as claimed in claim 1, wherein the secondary side comprises a rectifying module, and the rectifying module comprises:

a rectifying switch coupled to the secondary-side winding, an output capacitor coupled to the rectifying switch and the output end, and configured provide the output voltage to the output end, and a rectifying controller coupled to the rectifying switch, and configured to continuously turn on and turn off the rectifying switch synchronously with the power switch, wherein the oscillation reduction control module is integrated with the rectifying controller so that the oscillation reduction operation is performed according to the resonance voltage when the rectifying controller controls the rectifying switch to be turned off.

3. The power conversion apparatus as claimed in claim 1, wherein the logic control unit enables the damping unit only when the voltage level of the winding voltage reaches to the enabled range for the first time.

4. The power conversion apparatus as claimed in claim 1, wherein the oscillation reduction control module further comprises:

an open-circuit detection unit coupled to the logic control unit and the secondary side, wherein the open-circuit detection unit is configured to detect whether a path between the output end and the secondary-side winding is open-circuit, and provide an open-circuit signal to the logic control unit; the logic control unit enables the damping unit when the path is open-circuit and the voltage level of the winding voltage reaches to the enabled range.

5. The power conversion apparatus as claimed in claim 1, wherein the oscillation reduction control module further comprises:

a disable unit coupled to the logic control unit, and configured to receive the winding voltage and the output voltage, wherein when the disable unit realizes that a path between the output end and the secondary-side winding is connected according to the winding voltage and the output voltage, or the power switch is turned on, the disable unit notifies the logic control unit to disable the damping unit through a disabled signal.

6. The power conversion apparatus as claimed in claim 5, wherein the disable unit realizes that the voltage level of the winding voltage is not in the enabled range according to the winding voltage and the reference voltage, the disable unit notifies the logic control unit to disable the damping unit through the disabled signal.

7. An oscillation reduction control module coupled to a power conversion apparatus, and the power conversion apparatus comprising a primary side and a secondary side, and the primary side coupled to a power switch, the oscillation reduction control module comprising:

a resonance detection unit configured to receive an output voltage outputted from the power conversion apparatus and a winding voltage at a secondary-side winding of the secondary side, compare the winding voltage with a threshold voltage corresponding to the output voltage, and provide an activation signal representing that the winding voltage starts to oscillate according to a result of comparing the winding voltage with the threshold voltage, a level trigger unit configured to receive the winding voltage, compare the winding voltage with a reference, and provide a trigger signal representing that a damper is provided according to a result of comparing the winding voltage with the reference voltage, a logic control unit configured to receive the activation signal and the trigger signal, a damping unit coupled to the logic control unit and the secondary-side winding, wherein the logic control unit enables the damping unit when a voltage level of the winding voltage is in an enabled range set by the reference voltage so that the damping unit provides the damper to the secondary-side winding to reduce an amplitude of the winding voltage by the damper, and a counting unit coupled to the level trigger unit and the logic control unit, wherein the counting unit sets a predetermined counting number, and starts to count the number of times of the oscillation after the oscillation is generated by the winding voltage; when the number of times of the oscillation reaches to the predetermined counting number, the counting unit provides the activation signal representing that the number of times of the oscillation reaches to the predetermined counting number.

8. The oscillation reduction control module as claimed in claim 7, wherein the logic control unit enables the damping unit only when the voltage level of the winding voltage reaches to the enabled range for the first time.

9. The oscillation reduction control module as claimed in claim 7, further comprising:

an open-circuit detection unit coupled to the logic control unit and the secondary side, wherein the open-circuit detection unit is configured to detect whether a path between an output end of providing the output voltage and the secondary-side winding is open-circuit, and provide an open-circuit signal to the logic control unit; the logic control unit enables the damping unit when the path is open-circuit and the voltage level of the winding voltage reaches to the enabled range.

10. The oscillation reduction control module as claimed in claim 7, further comprising:

a disable unit coupled to the logic control unit, and configured to receive the winding voltage and the output voltage, wherein when the disable unit realizes that a path between the output end and the secondary-side winding is connected according to the winding voltage and the output voltage, or the power switch is turned on, the disable unit notifies the logic control unit to disable the damping unit through a disabled signal.

11. The oscillation reduction control module as claimed in claim 10, wherein the disable unit realizes that the voltage level of the winding voltage is not in the enabled range according to the winding voltage and the reference voltage, the disable unit notifies the logic control unit to disable the damping unit through the disabled signal.

12. A method of operating an oscillation reduction control module, applied to a power conversion apparatus having a primary side and a secondary side, and the primary side coupled to a power switch; the power conversion apparatus configured to control the power switch continuously turning on and turning off and convert an input voltage into an output voltage through the primary side and the secondary side, the method comprising steps of:
receiving the output voltage and a winding voltage at a secondary-side winding of the secondary side,
comparing the winding voltage and a threshold voltage corresponding to the output voltage, and providing an activation signal representing that the winding voltage starts to generate an oscillation according to a result of comparing the winding voltage with the threshold voltage,
comparing the winding voltage and a reference voltage, and providing a trigger signal representing that a damper is provided according to a result of comparing the winding voltage with the reference voltage,
determining whether a voltage level of the winding voltage is in an enabled range set by the reference voltage according to the activation signal and the trigger signal,
enabling a damping unit when the voltage level of the winding voltage so that the damping unit provides a damper to the secondary-side wining to reduce an amplitude of the winding voltage
setting a predetermined counting number,
counting the number of times of the oscillation after the winding voltage starts to generate the oscillation, and
providing the activation signal representing that the number of times of the oscillation reaches to the predetermined counting number when the number of times of the oscillation reaches to the predetermined counting number.

13. The method of operating the oscillation reduction control module as claimed in claim 12, further comprising a step of:
enabling the damping unit only when the voltage level of the winding voltage reaches to the enabled range for the first time.

14. The method of operating the oscillation reduction control module as claimed in claim 12, further comprising steps of:
detecting whether a path between an output end of providing the output voltage and the secondary-side winding is open-circuit, and
enabling the damping unit when the path is open-circuit and the voltage level of the winding voltage is in the enabled range.

15. The method of operating the oscillation reduction control module as claimed in claim 12, further comprising steps of:
disabling the damping unit when a path between the output end and the secondary-side winding is connected according to the winding voltage and the output voltage or when the power switch is turned on, and
disabling the damping unit when the voltage level of the winding voltage is not in the enabled range according to the winding voltage and the reference voltage.

* * * * *